US006406785B1

(12) United States Patent
Janes et al.

(10) Patent No.: US 6,406,785 B1
(45) Date of Patent: Jun. 18, 2002

(54) WEATHERSEAL HAVING A CONTACT LAYER WITH THERMOPLASTIC PARTICLES IN A THERMOSET CARRIER

(75) Inventors: Dennis W. Janes, Hamilton, IL (US); Jason O. Watts, Fort Madison, IA (US); Kevin Dale Utterback, Warsaw, IL (US); Krishnamachari Gopalan, Knoxville, TN (US)

(73) Assignee: Schlegel Corporation, New York, NY (US)

( * ) Notice: Subject to any disclaimer, the term of this patent is extended or adjusted under 35 U.S.C. 154(b) by 0 days.

(21) Appl. No.: 09/338,094

(22) Filed: Jun. 23, 1999

Related U.S. Application Data

(60) Provisional application No. 60/093,080, filed on Jul. 16, 1998.

(51) Int. Cl.[7] .................................................. B32B 5/16
(52) U.S. Cl. .................... 428/327; 428/323; 428/424.2; 428/424.8; 428/500; 428/521; 428/523
(58) Field of Search ................................ 428/323, 327, 428/423.1, 429.2, 429.8, 500, 521, 523

(56) References Cited

U.S. PATENT DOCUMENTS

| 4,511,526 A | | 4/1985 | Yamaguchi ................. 269/129 |
|---|---|---|---|
| 4,670,508 A | * | 6/1987 | Ohdaira et al. ................ 525/64 |
| 4,753,845 A | | 6/1988 | Sumi et al. ................... 928/327 |
| 4,894,289 A | | 1/1990 | Otawa et al. ............ 428/424.2 |
| 4,897,298 A | | 1/1990 | Otawa et al. ................ 428/122 |
| 4,945,123 A | | 7/1990 | Miyama et al. ............. 524/269 |
| 4,957,801 A | | 9/1990 | Maranci et al. ............. 428/147 |
| 5,013,379 A | | 5/1991 | Brooks et al. ......... 156/244.11 |
| 5,057,353 A | | 10/1991 | Maranci et al. ............. 428/147 |
| 5,110,685 A | | 5/1992 | Cross et al. ................ 428/494 |
| 5,115,007 A | * | 5/1992 | Chihara et al. ............. 524/267 |
| 5,137,675 A | | 8/1992 | Rabe ..................... 264/173.17 |
| 5,221,707 A | | 6/1993 | Chihara et al. ............. 524/267 |
| 5,276,106 A | | 1/1994 | Portelli et al. .............. 525/423 |
| 5,283,100 A | | 2/1994 | Yui et al. .................... 428/120 |
| 5,284,912 A | | 2/1994 | Sato et al. ..................... 524/65 |
| 5,292,584 A | | 3/1994 | Howard et al. ............. 428/327 |
| 5,298,581 A | | 3/1994 | Mitacek et al. ............. 526/232 |
| 5,302,463 A | | 4/1994 | Murata et al. .............. 428/517 |
| 5,343,655 A | | 9/1994 | Miyakawa et al. ........... 49/441 |
| 5,369,914 A | | 12/1994 | Takeuchi .................... 49/495.1 |
| 5,378,543 A | | 1/1995 | Murata et al. .............. 428/514 |
| 5,405,686 A | | 4/1995 | Portelli et al. .............. 442/149 |
| 5,424,019 A | | 6/1995 | Miyakawa et al. .... 269/177.17 |
| 5,424,135 A | | 6/1995 | Murata et al. .............. 428/517 |
| 5,441,685 A | | 8/1995 | Miyakawa et al. ......... 269/148 |
| 5,447,671 A | | 9/1995 | Kato et al. .................. 264/148 |
| 5,462,996 A | | 10/1995 | Portelli et al. .............. 525/423 |
| 5,472,782 A | | 12/1995 | Naritomi ..................... 428/412 |
| 5,538,777 A | | 7/1996 | Pauley et al. ............... 428/122 |
| 5,626,383 A | | 5/1997 | Lee et al. .................. 296/196.9 |

(List continued on next page.)

FOREIGN PATENT DOCUMENTS

| EP | 0 527 929 B1 | 8/1995 |
|---|---|---|
| JP | 2-89639 | 3/1990 |

Primary Examiner—Blaine Copenheaver
Assistant Examiner—Christopher Paulraj
(74) Attorney, Agent, or Firm—Brian B. Shaw, Esq.; Stephen B. Salai, Esq.; Harter, Secrest & Emery LLP

(57) ABSTRACT

A weatherseal for repeatedly and releasably contacting a panel to provide a weather resistant seal therebetween. The weatherseal includes a substrate having a contact layer on the portion of the substrate that contacts the panel. The contact layer includes a multitude of surface treated ultra high molecular weight olefinic particles, such as ultra high molecular weight polyethylene, in a thermoset material such as cross linkable urethane, wherein some of the embedded particles define the area of contact between the weatherseal and the panel.

30 Claims, 3 Drawing Sheets

U.S. PATENT DOCUMENTS

| | | |
|---|---|---|
| 5,635,274 A | 6/1997 | Chihara et al. .............. 428/122 |
| 5,693,414 A | 12/1997 | Peiffer et al. ................ 428/327 |
| 5,702,827 A | 12/1997 | Itoh et al. .................... 428/519 |
| 5,716,573 A | 2/1998 | Kamei ................... 369/171.13 |
| 5,746,867 A | 5/1998 | Chihara et al. .............. 196/242 |
| 5,763,011 A | 6/1998 | Miyama et al. ........... 427/393.5 |
| 5,766,703 A | 6/1998 | Mori et al. .................... 428/31 |
| 5,807,639 A | 9/1998 | Frappier et al. .......... 428/475.5 |
| 5,817,414 A | 10/1998 | Ando .......................... 428/358 |
| 5,844,051 A | 12/1998 | Onzuka et al. .............. 529/452 |
| 5,889,114 A | 3/1999 | Statz |
| 5,891,538 A | 4/1999 | Yamamoto et al. |
| 5,958,318 A | 9/1999 | Hayashi |

* cited by examiner

UNTREATED PARTICLE

TREATED PARTICLE

WEATHERSEAL HAVING A CONTACT LAYER WITH THERMOPLASTIC PARTICLES IN A THERMOSET CARRIER

THis application claims priority from provisional application Ser. No. 60/093,080, filed Jul. 16, 1998.

FIELD OF THE INVENTION

The present invention relates to a weatherseal for releasably contacting a panel, and more particularly, to a weatherseal for releasably contacting a glass panel in an automobile, wherein the weatherseal includes a contact layer with a reduced coefficient of friction for allowing the glass panel to be smoothly moved into and out of contact with the weatherseal, while reducing passage of water or air between a seated glass panel and the weatherseal. Specifically, the present weatherseal includes a thermoset, thermoplastic or combined substrate having a contact layer for contacting a panel, wherein the contact layer includes a multitude of surface treated thermoplastic particles in a thermoset material.

BACKGROUND OF THE INVENTION

Many vehicles employ windows formed of glass panels, wherein the window is moveable relative to a portion of the vehicle. A common construction includes the use of a glass panel in a door, wherein the door and the glass panel move relative to the remainder of the vehicle, and the glass panel moves relative to the door. In this construction, the glass panel is frequently moved between an open position and closed position with respect to the door and/or a portion of the vehicle frame. Increased business transactions such as restaurant, banking and pharmacy services are now regularly offered in a drive-through format. These transactions require the repeated release and engagement of the glass panel and vehicle. The repeated opening and closing of the glass panel places significant stress on the seal between the glass panel and the vehicle.

Traditionally, a weatherseal is employed at the interface between the glass panel and the vehicle door and/or the vehicle. The interface between the weatherseal and the glass panel must be sufficient to substantially preclude the penetration of water and air along the periphery of the glass panel, while still permitting ready engagement and disengagement of the glass panel without requiring significant force.

Conventional sealing structures include a soft synthetic resin or synthetic rubber. However, such weatherseals do not provide for the ready opening and closing of the glass panel relative to the seal. Further this structure often presents difficulty in securing of the door relative to the vehicle. Further, a large force is loaded on the window glass during opening or closing.

Therefore, the need exists for a weatherseal that has reduced force requirements for moving a glass panel into and out of engagement with the weatherseal. The need also exists for a weatherseal having enhanced wear capabilities. A need also exists for a method of forming a low friction weatherseal.

SUMMARY OF THE INVENTION

The present invention provides a weatherseal for repeatedly releasably contacting a panel, wherein the weatherseal has a reduced coefficient of friction between the weatherseal and the panel, while providing enhanced sealing characteristics. The weatherseal of the present invention also provides enhanced durability in terms of engagement/disengagement cycles.

Generally, the present weatherseal includes a substrate having a contact layer on a portion of the substrate, wherein the contact layer includes thermoplastic particles, at least partially embedded in a thermoset material. In one configuration, the thermoplastic particles are chemically bonded to the thermoset material. In a preferred configuration, the thermoplastic particles are ultra high molecular weight "UHMW" polyethylene and the thermoset material is a cross linked urethane. In a further configuration, the UHMW polyethylene particles are surface treated with reactive gasses prior to mixing with the urethane. It is also contemplated that the contact layer may be formed on only a portion of the weatherseal and that the contact layer may be formed as a layer.

The present invention contemplates the manufacture of a weatherseal by treating thermoplastic particles such as UHMW polyethylene or with reactive gasses, prior to combination with a thermoset material. In a preferred construction, the thermoset material is a cross linked urethane. The thermoplastic particles, such as treated UHMW polyethylene particles are then mixed with the thermoset material such as urethane and a quantity of silicone for lubricity. A substrate formed of materials such as EPDM or TPE is extruded and the thermoplastic particle-thermoset material mixture is applied to the extruded substrate. The thermoset material of the contact layer is then cured, wherein the discrete characteristic of individual thermoplastic particles is maintained.

DETAILED DESCRIPTION OF THE PREFERRED EMBODIMENT

The present weatherseal 20 is operably located between a panel 10 and a portion of a vehicle. It is understood the panel 10 may be any of a variety of materials and does not limit the present invention. For example, the panel 10 may be glass, metal or a composite, which is painted, surface treated or bare. In the operating environment, the panel 10 is brought repeatedly into and out of engagement with the weatherseal 20. The engagement of the panel 10 and the weatherseal 20 may result from motion of the panel, the weatherseal or a combination of both. Generally, the weatherseal 20 is disposed between the glass panel and a door, a frame of the door, or a portion of a vehicle frame.

The weatherseal 20 includes a substrate 40 and a contact layer 60, wherein the contact layer will contact the panel either during motion of the panel relative to the weatherseal or in a seated position of the panel.

For purposes of the present description, it is understood that the term "thermoplastic" includes those materials that soften under the action of heat to exhibit a melting point and solidify upon cooling in a reversible operation. For purposes of the present description, it is understood that the term "thermoset" includes those materials that are in an inflexible state and under the application of heat do not reach a melting point.

The present weatherseal is described in terms of the substrate 40 and the contact layer 60 on the substrate. It is understood that the contact layer 60 may be located on only a portion of the substrate 40.

Figure 1:
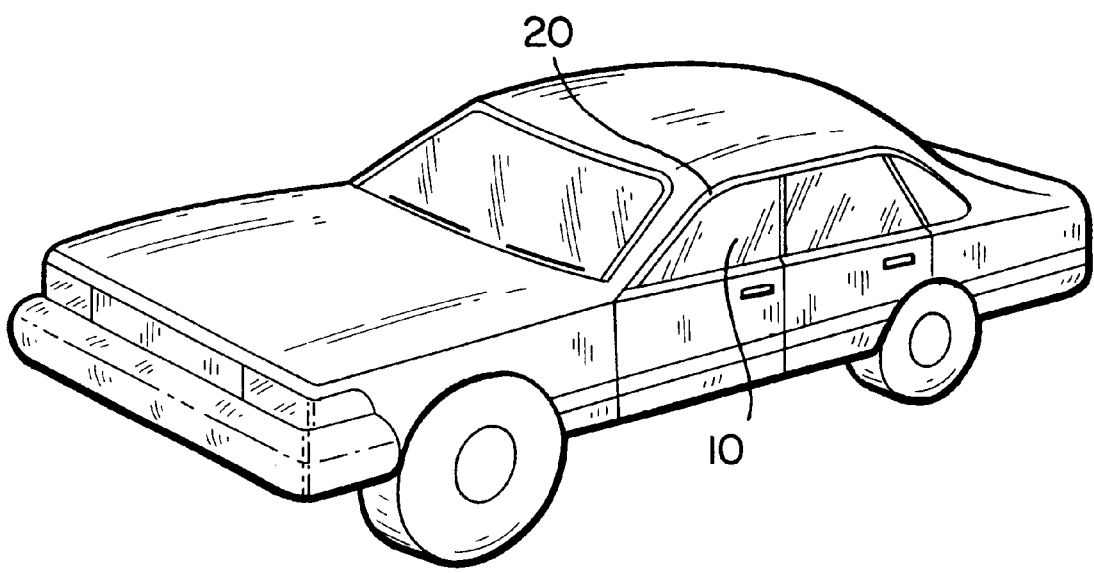
FIG. 1 is a perspective view of a vehicle that may employ various configurations of the present weatherseal.
Figure 2:
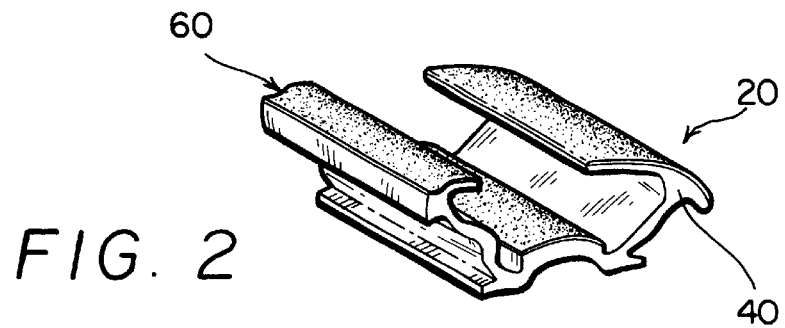
FIG. 2 is perspective view of a first configuration of a weatherseal embodying the present invention.
Figure 3:
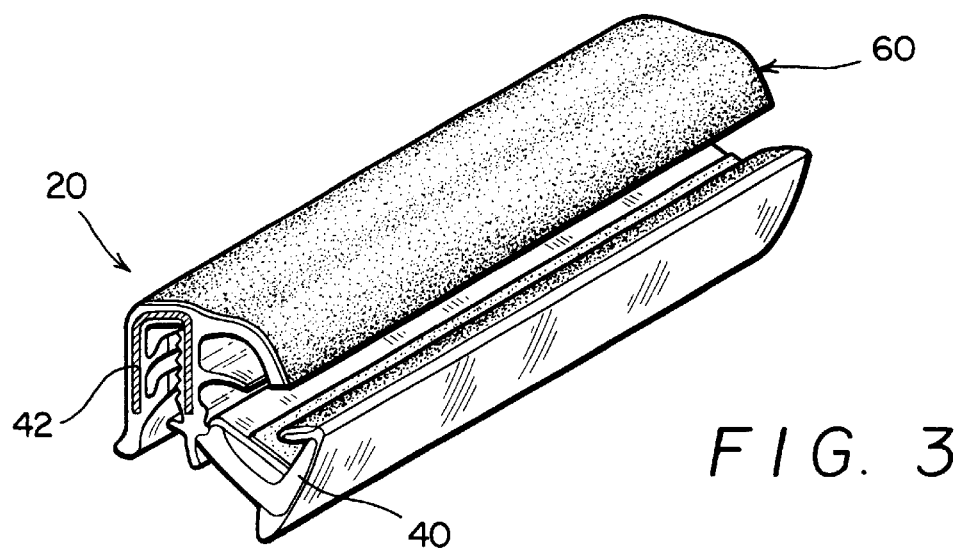
FIG. 3 is perspective view of a second weatherseal employing the present invention.
Figure 4:
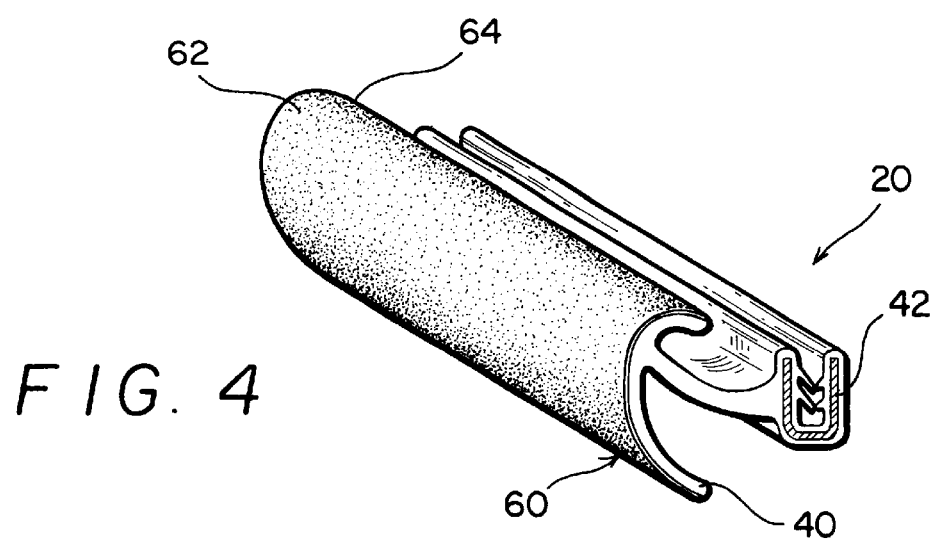
FIG. 4 is a perspective view of a third configuration of weatherseal employing the present invention.
Figure 5:
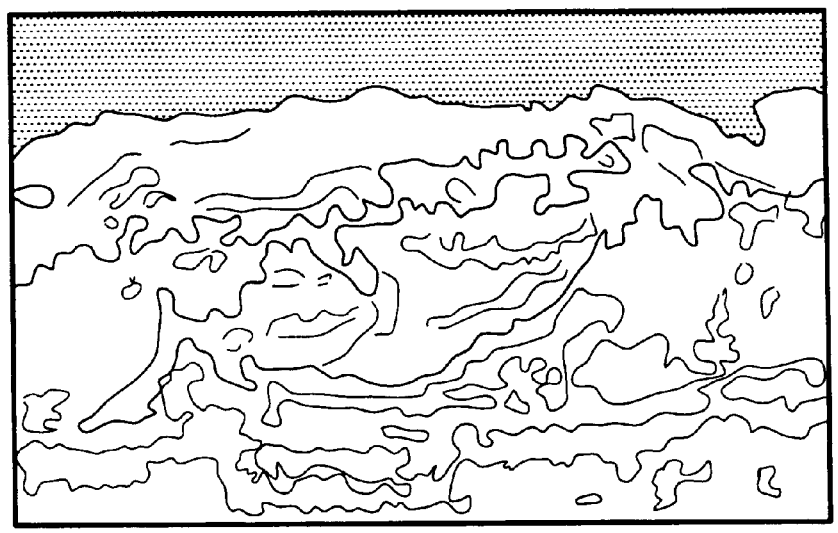
FIG. 5 is an enlarged cross sectional view of an untreated thermoplastic particle with unsatisfactory bonding characteristics to a thermoset material.
Figure 6:
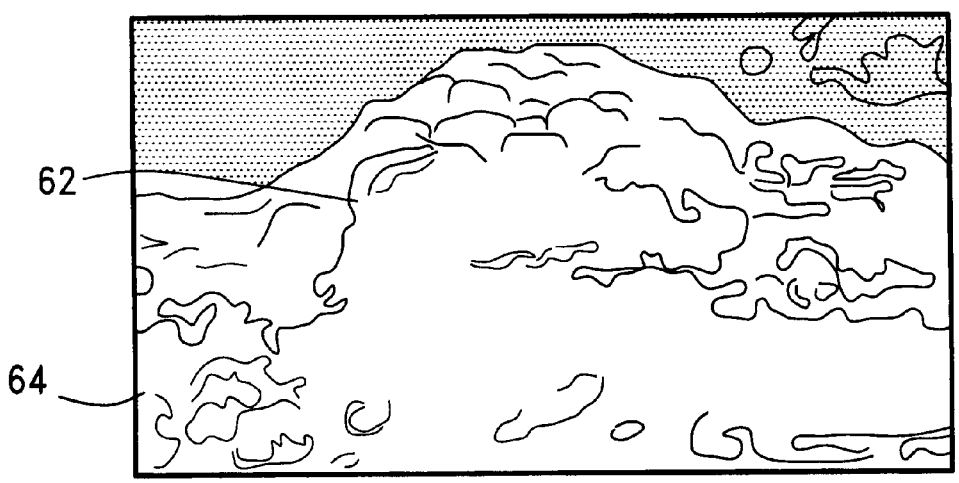
FIG. 6 is an enlarged view of a surface treated thermoplastic particle sufficiently chemically bonded to a thermoset material.

The substrate 40 may be formed from a variety of materials including thermoset, and thermoplastic materials as well as thermoplastic elastomers (TPEs). A typical thermoset material is EPDM or a modified EPDM. As shown in FIGS. 3 and 4, the substrate 40 may include a reinforcing member 42 such as a knitted carrier, a wire carrier, a stamped metal carrier or even a relatively rigid material such as thermoplastic. The substrate 40 may have any of a variety of cross sectional profiles including "C", "J", "U" or planar. It is understood the substrate 40 may also be formed to have a varying cross section along the length of the weatherseal 20.

The contact layer 60 is disposed on the substrate 40 and is preferably located at those areas of contact between the weatherseal 20 and the panel. Generally, the contact layer 60 includes a multitude of thermoplastic particles 62 in a thermoset carrier 64, wherein the multitude of particles have a melting temperature greater than a curing temperature of the carrier. In a first configuration, the particles 62 are ultra high molecular weight (UHMW) olefinic particles and the carrier 64 is a cross linkable urethane.

The carrier 64 is a thermoset material disposed on the substrate 40 and subsequently cured (cross linked). A suitable material for the carrier 64 is a urethane base having a catalyst and silicone to provide enhanced lubricity. A particular material for the carrier 64 is a cross linkable urethane solution CHBMLOK Z320 by Lord Corporation, with a catalyst such as Z320 B to increase lubricity and adhesion to the UHMW olefinic particles. The carrier material has a curing temperature at which the material becomes cross linked and thermoset. In one configuration, the carrier 64 sufficiently bonds to the substrate 40 to obviate the need for intermediate adhesives.

The UHMW olefinic particles 62 are embedded in the thermoset carrier 64 so as to be bonded to the carrier and hence the substrate 40. Preferably, the UHMW olefinic particles 62 are chemically bonded to the thermoset material of the carrier 64.

In the contact layer 60, the UHMW olefinic particles 62 may be UHMW polypropylene and the thermoset material 64 may be a cross linked urethane. The contact layer 60 may have a thickness ranging from approximately 10 to approximately 300 microns. The thickness of the contact layer 60 is at least partially determined by the intended operating environment of the weather seal 20. Generally, the greater the required flexibility of the seal 20 or the greater the amount flexure imparted to the contact layer, the thinner the contact layer 60. A preferred thickness of the contact layer 60 is approximately 20 microns to approximately 50 microns.

The UHMW olefinic particles 62 may be in a size range of approximately 20 microns to approximately 200 microns, with a selected range of approximately 35 microns to approximately 120 microns, and a preferred range from approximately 35 microns to approximately 65 microns. For UHMW olefinic particles 62 formed of UHMW polyethylene, the preferred size range is from approximately 35 microns to approximately 65 microns.

The UHMW particles 62 are thermoplastic and have a melting temperature. By controlling the molecular weight of the particles 62 and the material of the particles, the melting temperature of the particles can be selected. Typically, molecular weights for the UHMW olefinic material is between approximately 3 to approximately 6 million. The melting temperature of the UHMW olefinic particles 62 is selected to exceed the curing temperature of the carrier 64.

UHMW olefinic particles 62 such as VISTAMER™ surface modified particles by Composite Particles, Inc. of Allentown, Pa. have been found suitable. The surface treatment in the VISTAMER particles results in permanent changes to the structure and properties of the polymer surface without sacrificing the desirable properties. The surface treated UHMW olefinic material and particularly the UHMW PE have been impacted polar functional groups of the particles, which results in high surface energy.

In the contact layer 60, the UHMW olefinic particles 62 are at least partially embedded within the thermoset carrier 64. A percentage of the thermoplastic particles 62 are entirely encapsulated by the thermoset material 64 and a percentage of the UHMW olefinic particles are at least partially encapsulated by the thermoset material. Thus, the contact layer 60 has a multitude of projections. The projections may be formed by the entirely encapsulated or partially encapsulated UHMW olefinic particles.

It is believed the thermoset material 64 may wear from thermoplastic (UHMW polyethylene) particles 62 at the surface of the contact layer 60, thus exposing the UHMW olefinic material to the panel. The modified UHMW polyethylene particles 62 are sufficiently chemically bonded to the modified urethane 64, such that unintended separation of the particles from the thermoset carrier is substantially precluded. As the overlying carrier material 64 is removed or abraded, or the overlying material deteriorates, the UHMW olefinic particles 62 do not separation from the carrier. Further, the stresses upon the UHMW olefinic particles 62 during engagement and disengagement with the panel do not induce separation of the UHMW olefinic particles from the carrier.

The relative high points defined by the projecting UHMW olefinic particles 62 (UHMW polyethylene), or the encapsulated UHMW olefinic particles provide a reduced surface area in contact with the panel. The projections are sufficiently sized and spaced to maintain a seal between the contact layer 60 and the panel. The reduced area of contact in combination with the UHMW olefinic particles 62 and thermoset carrier 64 results in a reduced static and dynamic coefficient of friction between the weatherseal and the panel. In addition, both wet and dry coefficients of friction are reduced by present configuration.

Method of Manufacture

The UHMW olefinic particles 62 are preferably formed of UHMW polyethylene. The UHMW polyethylene may be processed from a sheet form. Preferably, the UHMW polyethylene is ground into particles ranging in size from approximately 35 microns to approximately 120 microns.

The UHMW polyethylene particles 62 are surface treated prior to combination with the thermoset material of the carrier 64. Specifically, the UHMW polyethylene particles 62 are surface treated with reactive gases. It is believed such a treatment induces a polarity in the previously non-polar olefins, including UHMW polyethylene.

The treated UHMW polyethylene particles 62 are then mixed with the modified urethane of the carrier 64 at a concentration from approximately 0.1 percent weight to approximately 25 percent weight, as dictated by the intended operating environment. A more preferred range of concentrations is approximately 0.5 percent weight to approximately 10 percent weight, wherein the most preferred concentration ranges in from approximately 1.5 percent to approximately 3.0 percent weight.

The substrate 40 is formed by extruding any of a variety of materials such as EPDM, modified EPDM, thermoplastics or TPE. It is understood the substrate 40 may be formed by any of a variety of processes including but not limited to inject molding, extrusion or sheeting. Preferably, the substrate 40 is formed of a thermoset material, having a hardness of approximately 70–80 shore A. The hardness is a parameter of the resulting structure and the desired performance characteristics and does not limit the scope of the invention. The substrate 40 is extruded and then vulcanized, in the case of thermoset EPDM. Alternatively, the substrate 40 is extruded and cooled in the case of TPE. An EPDM substrate may be treated by either corona or with a chemical primer or by wire brushing. However, it is preferable to select substrate materials that are sufficiently active to adhere to the contact layer 60 to obviate the need for these secondary procedures.

The urethane carrier 64 with the UHMW olefinic particles 62 is then applied to the substrate 40. In one configuration, the UHMW olefinic particles and the thermoset carrier material urethane are applied by a spray application. Thus, the UHMW olefinic particles and the thermoset carrier material are disposed on a desired portion of the substrate 40.

In the configuration employing cross linkable urethane as the carrier material 64, the urethane is then cross linked to form a thermoset material to which the UHMW olefinic particles are chemically bonded. The urethane may be cross linked by any of a variety of mechanisms such as curing in an oven at a predetermined temperature and duration. As the melting temperature of the UHMW olefinic particles 62 is greater than the curing temperature of the carrier 64, the integrity of the particles is not jeopardized during curing of the carrier. That is, the UHMW olefinic particles discrete characteristics and retain their shape to form the projections in the surface of the contact layer 60.

It is believed the pre-treatment of the UHMW olefinic material and particularly the UHMW polyethylene particles induces a polarity which then results in a chemical bond between the olefinic particles 62 and the urethane (cross linked urethane) carrier 64. Thus, in contrast to prior devices which employ a mechanical type of bond between particles and a carrier, the present invention produces chemical bond between the UHMW olefinic particles 62 and the thermoset urethane carrier 64. The chemical bond provides an enhanced retaining force on the UHMW olefinic particle 62. Thus, the present UHMW olefinic particles 62 substantially resist separation from the thermoset carrier during installation or use of the weatherseal 20. As the weatherseal 20 is stressed during formation, installation or use, the UHMW olefinic particles 62 remain bonded to the carrier 64 and hence the substrate 40.

In addition, it has been found that the use of the particles reduces noise generation upon relative movement between the panel and the weatherseal.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims, which scope is to be accorded the broadest interpretation so as to encompass all such modifications and equivalent structures.

What is claimed is:

1. A weatherseal for releasably contacting a panel, comprising:
   (a) a substrate; and
   (b) a contact layer on at least a portion of the substrate, the contact layer including a thermoset carrier and a multitude of UHMW polyethylene particles having a polar functional group, the UHMW polyethylene particles chemically bonded to the thermoset carrier to form surface projections.

2. The weatherseal of claim 1, wherein the thermoset carrier includes cross linkable urethane.

3. The weatherseal of claim 1, wherein the substrate includes one of an EPDM, a thermoplastic and a thermoplastic elastomer.

4. A weatherseal, comprising:
   (a) a substrate including one of an EPDM, a thermoplastic and a thermoplastic elastomer; and
   (b) a contact layer on the substrate, the contact layer including surface treated UBMW polyolefin particles in a cross linked urethane based carrier, the surface treated UHMW polyolefin particles forming projections.

5. The weatherseal of claim 4, wherein the UHMW polyolefin particles are cross linked.

6. A contact layer for a weatherseal, comprising a multitude of surface treated thermoplastic particles bonded to a curable carrier the surface treated thermoplastic particles creating a reduced coefficient of friction of the contact layer.

7. The contact layer of claim 5, wherein the thermoplastic particles are surface treated UHMW polyethylene.

8. The contact layer of claim 5, wherein the carrier includes urethane.

9. A weatherseal, comprising:
   (a) a substrate; and
   (b) a contact layer on a portion of the substrate, the contact layer having a multitude of surface treated olefinic particles in a cured thermoset urethane based carrier, the surface treated olefinic particles sized to create surface projections in the contact layer.

10. The weatherseal of claim 9, wherein the substrate includes one of an EPDM, a thermoplastic and a thermoplastic elastomer.

11. The weatherseal of claim 9, wherein the surface treated olefinic particles are UHMW polyethylene.

12. The weatherseal of claim 9, wherein the surface treated olefinic particles are chemically bonded to the cured thermoset urethane based carrier.

13. The weatherseal of claim 9, wherein the surface treated olefinic particles are sufficiently bonded to the carrier to substantially preclude separation.

14. The weatherseal of claim 9, wherein the surface treated olefinic particles are encapsulated within the carrier.

15. The weatherseal of claim 9, wherein the surface treated olefinic particles have a polar functional group.

16. A method of forming a weatherseal, comprising:
   (a) forming a substrate;

(b) mixing a multitude of surface treated olefinic particles and a curable thermoset urethane based carrier;

(c) disposing the mixed surface treated olefinic particles and the curable thermoset urethane based carrier on a portion of the substrate; and (d) curing the curable thermoset urethane based carrier as it is disposed on the substrate to retain discrete surface treated olefinic particles.

17. A weatherseal, comprising:

(a) a substrate; and (b) a contact layer on a portion of the substrate, the contact layer having a multitude of surface treated olefinic particles in a cured thermoset urethane based carrier, the surface treated olefinic particles having a melting temperature greater than a curing temperature of the urethane based carrier.

18. The weatherseal of claim 17, wherein the substrate includes one of an EPDM, a thermoplastic and a thermoplastic elastomer.

19. The weatherseal of claim 17, wherein the surface treated olefmic particles are UHMW polyethylene.

20. The weatherseal of claim 17, wherein the surface treated olefinic particles are chemically bonded to the cured thermoset urethane based carrier.

21. The weatherseal of claim 17, wherein the surface treated olefinic particles are sufficiently bonded to the carrier to substantially preclude separation.

22. The weatherseal of claim 17, wherein the surface treated olefinic particles are encapsulated within the carrier.

23. The weatherseal of claim 17, wherein the surface treated olefinic particles have a polar functional group.

24. A weatherseal, comprising:

(a) a substrate; and (b) a contact layer on a portion of the substrate, the contact layer having a multitude of surface treated olefinic particles in a cured thermoset carrier, the surface treated olefinic particles having a melting temperature greater than a curing temperature of the thermoset carrier.

25. The weatherseal of claim 24, wherein the substrate includes one of an EPDM, a thermoplastic and a thermoplastic elastomer.

26. The weatherseal of claim 24, wherein the surface treated olefinic particles are UHMW polyethylene.

27. The weatherseal of claim 24, wherein the surface treated olefinic particles are chemically bonded to the cured thermoset urethane based carrier.

28. The weatherseal of claim 24, wherein the surface treated olefinic particles are sufficiently bonded to the carrier to substantially preclude separation.

29. The weatherseal of claim 24, wherein the surface treated olefinic particles are encapsulated within the carrier.

30. The weatherseal of claim 24, wherein the surface treated olefinic particles have a polar functional group.

* * * * *

UNITED STATES PATENT AND TRADEMARK OFFICE
CERTIFICATE OF CORRECTION

PATENT NO. : 6,406,785 B1  Page 1 of 1
DATED : June 18, 2002
INVENTOR(S) : Dennis W. Janes, Jason O. Watts, Kevin Dale Utterback and Krishnamachari Gopalan It is certified that error appears in the above-identified patent and that said Letters Patent is hereby corrected as shown below:

<u>Column 6,</u>
Line 29, replace the term "UBMW" with -- UHMW --.

Signed and Sealed this

Fifth Day of November, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO.    : 6,406,785 B1
DATED         : June 18, 2002
INVENTOR(S)   : Dennis W. Janes, Jason O. Watts, Kevin Dale Utterback and Krishnamachari Gopalan It is certified that error appears in the above-identified patent and that said Letters Patent is hereby corrected as shown below:

<u>Column 4,</u>
Line 40, replace the term "CHBMLOK" with -- CHEMLOK --.

Signed and Sealed this

Eleventh Day of February, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,406,785 B1
DATED : June 18, 2002
INVENTOR(S) : Dennis W. Janes et al.

It is certified that error appears in the above-identified patent and that said Letters Patent is hereby corrected as shown below:

<u>Column 6, lines 11-67 through Column 8, lines 1-28,</u>
Replace with the following Claims 1 through 30, -- 1. A weatherseal for releasably contacting a panel, comprising:
(a) a substrate; and
(b) a contact layer on at least a portion of the substrate, the contact layer including a thermoset carrier and a multitude of cross linked UHMW polyethylene particles having a polar functional group, the UHMW polyethylene particles chemically bonded to the thermoset carrier to form surface projections.

2. The weatherseal of Claim 1, wherein the thermoset carrier includes cross linkable urethane.

3. The weatherseal of Claim 1, wherein the substrate includes one of an EPDM, a thermoplastic and a thermoplastic elastomer.

4. A weatherseal, comprising:
(a) a substrate including one of an EPDM, a thermoplastic and a thermoplastic elastomer; and
(b) a contact layer on the substrate, the contact layer including surface treated cross linked UHMW polyolefin particles in a cross linked urethane based carrier, the surface treated UHMW polyolefin particles forming projections.

5. A contact layer for a weatherseal, comprising a multitude of surface treated thermoplastic cross linked particles bonded to a curable carrier, the surface treated thermoplastic particles creating a reduced coefficient of friction of the contact layer.

6. The contact layer of Claim 5, wherein the thermoplastic surface treated particles are an ultra high molecular weight olefin.

7. The contact layer of Claim 5, wherein the thermoplastic surface treated particles are surface treated UHMW polyethylene.

8. The contact layer of Claim 5, wherein the carrier includes urethane.

9. A weatherseal, comprising:
(a) a substrate; and
(b) a contact layer on a portion of the substrate, the contact layer having a multitude of cross linked surface treated olefinic particles in a cured thermoset urethane based carrier, the surface treated olefinic particles sized to create surface projections in the contact layer.

10. The weatherseal of Claim 9, wherein the substrate includes one of an EPDM, a thermoplastic and a thermoplastic elastomer.

11. The weatherseal of Claim 9, wherein the surface treated olefinic particles are UHMW polyethylene.

12. The weatherseal of Claim 9, wherein the surface treated olefinic particles are chemically bonded to the cured thermoset urethane based carrier.

UNITED STATES PATENT AND TRADEMARK OFFICE
CERTIFICATE OF CORRECTION

PATENT NO. : 6,406,785 B1
DATED : June 18, 2002
INVENTOR(S) : Dennis W. Janes et al.

It is certified that error appears in the above-identified patent and that said Letters Patent is hereby corrected as shown below:

13. The weatherseal of Claim 9, wherein the surface treated olefinic particles are sufficiently bonded to the carrier to substantially preclude separation.

14. The weatherseal of Claim 9, wherein the surface treated olefinic particles are encapsulated within the carrier.

15. The weatherseal of Claim 9, wherein the surface treated olefinic particles have a polar functional group.

16. A method of forming a weatherseal, comprising:
(a) forming a substrate;
(b) mixing a multitude of surface treated, cross linked olefinic particles and a curable thermoset urethane based carrier;
(c) disposing the mixed surface treated olefinic particles and the curable thermoset urethane based carrier on a portion of the substrate; and
(d) curing the curable thermoset urethane based carrier as it is disposed on the substrate to retain discrete surface treated olefinic particles and form surface projections.

17. A Weatherseal, comprising:
(a) a substrate; and
(b) a contact layer on a portion of the substrate, the contact layer having a multitude of cross linked surface treated olefinic particles in a cured thermoset urethane based carrier, the surface treated olefinic particles having a melting temperature greater than a curing temperature of the urethane based carrier.

18. The weatherseal of Claim 17, wherein the substrate includes one of an EPDM, a thermoplastic and a thermoplastic elastomer.

19. The weatherseal of Claim 17, wherein the surface treated olefinic particles are UHMW polyethylene.

20. The weatherseal of Claim 17, wherein the surface treated olefinic particles are chemically bonded to the cured thermoset urethane based carrier.

21. The weatherseal of Claim 17, wherein the surface treated olefinic particles are sufficiently bonded to the carrier to substantially preclude separation.

22. The weatherseal of Claim 17, wherein the surface treated olefinic particles are encapsulated within the carrier.

23. The weatherseal of Claim 17, wherein the surface treated olefinic particles have a polar functional group.

24. A weatherseal, comprising:
(a) a substrate; and
(b) a contact layer on a portion of the substrate, the contact layer having a multitude of surface treated, cross linked olefinic particles in a cured thermoset carrier, the surface treated, cross linked olefinic particles having a melting temperature greater than a curing temperature of the thermoset carrier.

UNITED STATES PATENT AND TRADEMARK OFFICE
CERTIFICATE OF CORRECTION

PATENT NO. : 6,406,785 B1
DATED : June 18, 2002
INVENTOR(S) : Dennis W. Janes et al.

It is certified that error appears in the above-identified patent and that said Letters Patent is hereby corrected as shown below:

25. The weatherseal of Claim 24, wherein the substrate includes one of an EPDM, a thermoplastic and a thermoplastic elastomer.
26. The weatherseal of Claim 24, wherein the surface treated olefinic particles are UHMW polyethylene.
27. The weatherseal of Claim 24, wherein the surface treated olefinic particles are chemically bonded to the cured thermoset urethane based carrier.
28. The weatherseal of Claim 24, wherein the surface treated olefinic particles are sufficiently bonded to the carrier to substantially preclude separation.
29. The weatherseal of Claim 24, wherein the surface treated olefinic particles are encapsulated within the carrier.
30. The weatherseal of Claim 24, wherein the surface treated olefinic particles have a polar functional group. --

Signed and Sealed this

Second Day of September, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,406,785 B1
DATED         : June 18, 2002
INVENTOR(S)   : Janes, Dennis W. et al.

It is certified that error appears in the above-identified patent and that said Letters Patent is hereby corrected as shown below:

<u>Column 3,</u>
Line 40 reading "CHBMLOK" should read -- CHEMLOK --.

Signed and Sealed this

Twelfth Day of October, 2004

JON W. DUDAS
*Director of the United States Patent and Trademark Office*